March 24, 1959 G. GARNIER 2,879,466
ELECTRICAL REGULATORS AND IN PARTICULAR
CARBON-PILE VOLTAGE REGULATORS
Filed April 24, 1957
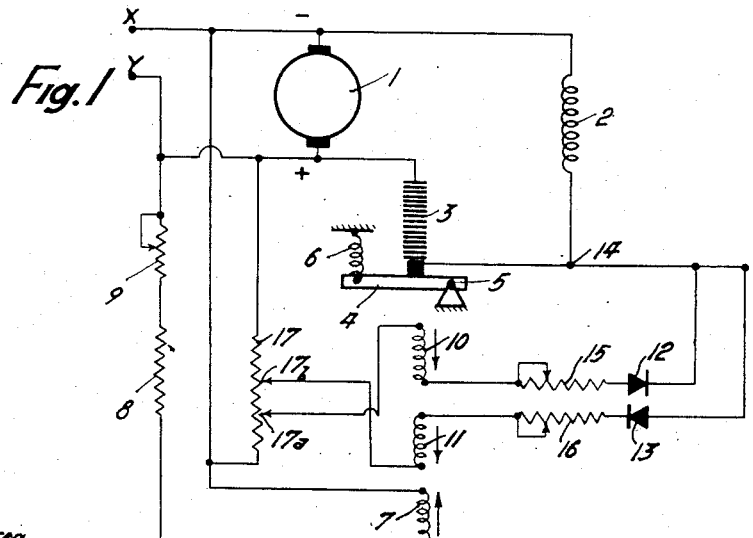
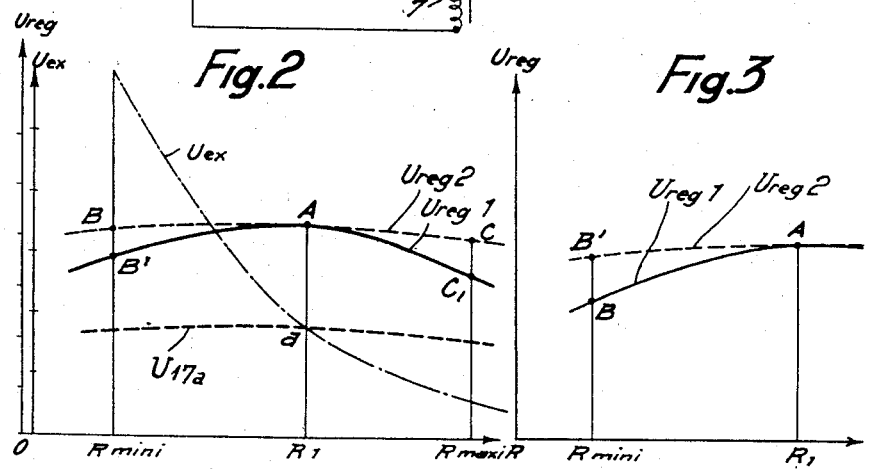
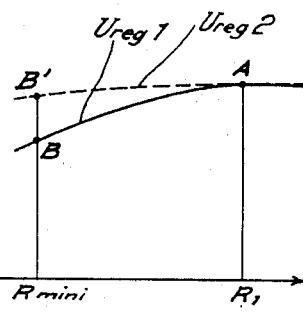
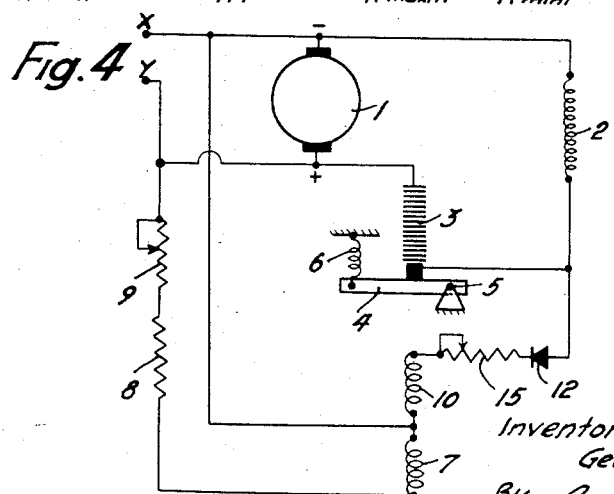
Inventor:
Georges Garnier
By Leonard S. Knox
Attorney

United States Patent Office 2,879,466
Patented Mar. 24, 1959

2,879,466

ELECTRICAL REGULATORS AND IN PARTICULAR CARBON-PILE VOLTAGE REGULATORS

Georges Garnier, Asnieres, France, assignor to Air-Equipement, Asnieres, France, a French company Application April 24, 1957, Serial No. 654,708

Claims priority, application France May 2, 1956

3 Claims. (Cl. 322—28)

The present invention relates to electrical regulators and in particular to carbon-pile voltage regulators consisting of a pile of carbon elements inserted in the exciting circuit of a generator, the resistance of the regulator being a function of the compression of the carbon-pile which compression is controlled, on the one hand, by a compression spring and, on the other, by a pressure-releasing electromagnet, the voltage controlling this magnet being the regulated voltage.

Some apparatus comprise, in addition to the main winding of the electromagnet, two auxiliary windings which are connected in opposition and of which one is excited through a non-linear circuit. These two auxiliary windings are so arranged that their actions cancel one another for the normal value of the regulated voltage. When this voltage deviates from this normal value, the action of one of the auxiliary windings overcomes that of the other and its action is added to or subtracted from that of the main winding as the case may be. As the non-linear circuit is generally a self-induction coil, the above-mentioned apparatus can only be used in the regulation of alternators.

The object of the present invention is to provide improvements in voltage regulators which render these regulators of use not only in the regulation of alternators but also in the regulation of direct current generators and which provide a more effective regulation.

The regulator embodying the present invention comprises at least one auxiliary winding co-operating with the main winding of the electromagnet which controls the release of pressure on the carbon pile regulating the exciting current, this auxiliary winding being, on the one hand, under the control of the exciting voltage of the machine to regulate (which voltage varies much more than the regulated voltage) and, on the other hand, connected in series with unidirectional current passage means (valving means) so that the action of the auxiliary winding can only subtract itself from the action of main winding.

In preferred embodiments, the voltage regulator of the invention has the following features and combinations of these features:

The unidirectional current passage means consist of a rectifier which is preferably a dry rectifier;

The auxiliary winding and the unidirectional current passage means are connected in series with a calibrated resistance (and/or a regulating rheostat);

The auxiliary winding and the unidirectional current passage means are connected, on the one hand, to the connection between the carbon pile and the exciting winding of the machine to regulate and, on the other hand, to an intermediate point on a resistance connected across the regulated voltage, which intermediate point provides a reference voltage;

In a modification, the electromagnet of the apparatus comprises two auxiliary windings each so adapted and combined with a rectifier and, if desired, a calibrated resistance that each of the auxiliary windings intervenes in bringing the regulated voltage to the desired normal value.

Further features and advantages of the invention will be apparent from the ensuing description of two embodiments of the invention with reference to the accompanying drawing to which the invention is in no way limited.

In the drawing:

Fig. 1 is a diagram of the connections of a first embodiment of the invention;

Fig. 2 is a diagram of the voltage curves at different points of the regulator as a function of the resistance of the carbon pile;

Fig. 3 is a diagram of operation corresponding to a simplified embodiment of the invention, and Fig. 4 is a diagram of the connections of the second simplified embodiment of the invention, the diagram of operation of this embodiment being similar to that shown in Fig. 3.

The regulator shown in Fig. 1 comprises a generator (dynamo or alternator) 1 whose voltage is to be regulated, an exciting or field winding 2 connected to one terminal of the generator, a carbon pile voltage regulator 3 connected in series with the field winding 2 and connected to the other terminal of the generator, and generator output terminals X and Y.

The compression of the carbon pile 3 is controlled by a movable armature 4 which is pivotally mounted at 5 and is subjected to the action of a tension spring 6.

The armature 4 is also subjected to the action of a pressure release electromagnet whose main winding 7 is shunt connected to the terminals of the generator, with interposition of a calibrated resistance 8 and, if desired, a regulating rheostat 9. In the case of an alternator, the winding 7 could be fed with the regulator and rectified alternating voltage.

In accordance with the invention, there are added to the winding 7 two auxiliary windings 10 and 11 each of which is interposed between a point supplying a reference voltage (referred to thereinunder) and a rectifier (12 for the winding 10 and 13 for the winding 11) connected to a connection 14 between the elements 2 and 3.

Inserted between the windings 10 and 11 and the corresponding rectifiers 12 and 13, are calibrated resistances 15 and 16 respectively.

The two auxiliary windings 10 and 11 and the corresponding rectifiers 12 and 13 are so arranged that the current which might pass through said windings produces ampere-turns which subtract themselves from those produced by main winding 7.

The reference voltage mentioned above is provided by a potentiometer arrangement comprising a resistance 17 having a connection 17a for the winding 10 and a connection 17b for the winding 11. The two connections 17a and 17b may coincide.

In order to understand the operation of the regulator just described, reference should be had to Fig. 2 in which the abscissae correspond to the resistance (variable) of the carbon pile 3 and the ordinates correspond to the voltages in the system.

In Fig. 2, the curve U17a is the curve of the voltage at point 17a of the resistance 17, the curve Uex is the curve of the exciting voltage, the curve Ureg1 is the curve of the regulated voltage of a voltage regulator of conventional type and the curve Ureg2 is the curve of the regulated voltage of a voltage regulator embodying the invention.

It can be seen that the curve Ureg1 has a maximum A for a certain value R1 of the resistance R (pile 3). For this value, the voltage at point 14 has the value $a$ on the curve Uex. The point 17a of the potentiometer arrangement having the resistance 17 is so chosen that this same voltage $a$ exists at this point.

In other words (assuming that 17b coincides with 17a) for a value R1 of the resistance of the carbon pile 3 and for a regulated voltage A, no current is carried by the auxiliary windings 10 and 11. The more the regulated voltage deviates from the maximum voltage A the greater the necessary reduction in the ampere-turns produced by the resistance 7 for the purpose of decreasing the resistance, since in order to obtain the curve $U{reg}2$, the voltage $U{reg}1$ must be raised from B' to B and from C' to C.

Between the values R minima and R1, it is the winding 11 which carries a current (voltage at 14 > voltage at 17b) which produces the negative ampere-turns required for improving the regulation.

Between the values R1 and R maxima, it is the winding 10 which is in action (voltage at 17a > voltage at 14).

The ampere-turns produced by the auxiliary windings 10 and 11 are substantially proportional to the potential difference between the points 14 and 17a, 17b, the point 14 being at the potential of the variable exciting voltage whereas the points 17a, 17b are at the potential of the exciting voltage giving the maximum regulated voltage A (voltage a).

In many regulators of known type there is no appreciable voltage drop (curve $U{reg}1$) for high values (greater than R1) of the resistance 3 (see Fig. 3). In these circumstances the auxiliary winding 10 is unnecessary.

In some cases even, the potentiometer arrangement (17, 17a, 17b shown in Fig. 1) is no longer necessary, because the required voltage at point 17b is very close to zero (to the regulated voltage). It is therefore possible to construct a very simple regulator of the type shown in Fig. 4, in which like reference characters denote like elements shown in Fig. 1.

Although specific embodiments of the invention have been described, many modifications and changes may be made therein without departing from the scope of the invention as defined in the appended claims.

What is claimed is:

1. In a voltage regulator for an electrical generator having an exciting circuit, said regulator comprising a pile of conductive material of the carbon type which is subjected to variable pressure and being connected in series with said exciting circuit, a spring for exerting said pressure on the pile of material, a pressure-release electromagnet adapted to act on said pile in the opposite manner to said spring and having a main winding fed with the voltage to be regulated by the regulator, at least one auxiliary winding which co-operates with the main winding and is fed with the exciting voltage of the generator, and valving means connected in series with said auxiliary winding, said valving means being so arranged as to allow the passage of current in the auxiliary winding in the direction from the positive end of the exciting circuit to the auxiliary winding which is so wound that the action of said winding can only substract itself from that of the main winding.

2. In a voltage regulator for an electrical generator having an exciting circuit, said regulator comprising a pile of conductive material of the carbon type, which is subjected to variable pressure and being connected in series with said exciting circuit, a spring for exerting said pressure on the pile of material, a pressure-release electromagnet adapted to act on said pile in the opposite manner to said spring and having a main winding fed with the voltage to be regulated by the regulator, at least one auxiliary winding which co-operates with the main winding and is fed with the exciting voltage of the generator, valving means connected in series with said auxiliary winding and a resistance which is connected in parallel with the generator and has a point thereon which provides a reference voltage and is connected to a terminal of the unit comprising the auxiliary winding and the electrical valving means, the other terminal of which unit is connected to the point of connection between the exciting winding and one end of the pile of conductive material.

3. In a voltage regulator for an electrical generator having an exciting circuit, said regulator comprising a pile of conductive material of the carbon type which is subjected to variable pressure and being connected in series with said exciting circuit, a spring for exerting said pressure on the pile of material, a pressure-release electromagnet adapted to act on said pile in the opposite manner to said spring and having a main winding fed with the voltage to be regulated by the regulator, at least one auxiliary winding which co-operates with the main winding and is fed with the exciting voltage of the generator, valving means connected in series with said auxiliary winding and a second auxiliary winding adapted to cooperate with the first-mentioned auxiliary winding and second electrical valving means connected in series with the second auxiliary winding and connected in the opposite direction to the first-mentioned electrical valving means.

References Cited in the file of this patent

UNITED STATES PATENTS 2,716,213    Neild _____ Aug. 23, 1955